United States Patent [19]

Huon et al.

[11] Patent Number: 5,467,359
[45] Date of Patent: Nov. 14, 1995

[54] APPARATUS FOR GENERATING AND CHECKING THE ERROR CORRECTION CODES OF MESSAGES IN A MESSAGE SWITCHING SYSTEM

[75] Inventors: Pierre J. Huon, Saint Laurent du Var; Philippe Jachimcsyk, Saint Jeannet; Gerard Barucchi, Villeneuve Loubet; Jean Calvignac, La Gaude; Fabrice Verplanken, Cagnes sur Mer, all of France

[73] Assignee: International Business Machines Corporation, Armonk, N.Y.

[21] Appl. No.: 24,061

[22] Filed: Mar. 1, 1993

[30] Foreign Application Priority Data

May 21, 1992 [EP] European Pat. Off. .............. 92480073

[51] Int. Cl.⁶ ..................................................... G06F 11/10
[52] U.S. Cl. ............................................ 371/37.1; 371/39.1
[58] Field of Search ............................. 371/30–34, 37.1, 371/37.4, 37.6, 38.1, 39.1; 370/60

[56] References Cited

U.S. PATENT DOCUMENTS 4,429,391  1/1984  Lee ............................................. 371/49
5,020,054  5/1991  May, Jr. .................................... 370/94.1
5,161,156  11/1992  Baum et al. ............................. 371/37.1
5,241,546  8/1993  Peterson et al. ........................ 371/39.1
5,271,020  12/1993  Marisetty ................................. 371/37.1

FOREIGN PATENT DOCUMENTS 0376464  9/1990  European Pat. Off. .

OTHER PUBLICATIONS

IEEE Transactions on Communications, vol. 39, No. 8, 1991, pp. 1175–1178.

Primary Examiner—Roy Envall
Assistant Examiner—Thomas E. Brown
Attorney, Agent, or Firm—Joscelyn G. Cockburn

[57] ABSTRACT

An error correction apparatus includes an error control circuit which computes for each burst of a message (for a destination unit) an error correction code as a function of an initial error correction code at the first burst of the message or of the error correction code of the previous burst and of the data bytes of the burst. The burst error correction code is sent on a medium which is separate from the data transport medium as a companion of the burst. Also, the error control circuit receives the burst error correction code from an origin unit and generates the burst error correction code to be compared with the received burst error correction code. If a mismatch is detected, the burst found in error is flagged.

13 Claims, 9 Drawing Sheets

APPARATUS FOR GENERATING AND CHECKING THE ERROR CORRECTION CODES OF MESSAGES IN A MESSAGE SWITCHING SYSTEM

DESCRIPTION OF THE INVENTION

The present invention relates to an apparatus for insuring the integrity of the messages exchanged between users in a multi origin/multi target user switching system. It relates more particularly to such an apparatus which is implemented in a switching system wherein the messages are exchanged thru fixed size bursts or cells.

BACKGROUND ART

In a switching system such as described in European Patent Application published under N° 0 387 464, messages are exchanged between data processing units, thru bursts comprising a fixed number of bytes. The switching system performs an optimized number of simultaneous transfers of data between pairs of units comprising an origin unit and a target unit selected among a plurality of data processing units attached to the switching system. Each unit includes a set of outbound queues with one outbound queue associated with each one of the data processing units to which it may sent data packets or messages, for storing the data packets to be sent by the data processing unit to the data processing unit associated with said one outbound queue.

The transfers are performed by a data switch during a burst time under control of switching control signals sent to the data switch by the selected units in response to control out signals generated by a scheduler during a previous burst time. The scheduler runs a selection algorithm which gives each unit an equal chance to be selected as origin unit and/or target unit in a given period.

It results from this switching concept, that the messages are transferred as a succession of bursts comprising a fixed number of bytes for example 32 bytes. Interleaved bursts of messages from/to different origin/target units are provided to the switching system, and the data bursts are switched with an associated control field comprising control information relative to the burst contents such as First burst/Last burst/ Byte count. The data bursts and associated control information are exchanged on separate media.

The message exchanges must be protected against any alterations. To do so an error correction code which maybe of a cyclic redundancy code CRC, must be included into each message. In conventional applications, the maximum message size is 64 kilobytes, thus a 19-bit CRC is needed to provide for an efficient detection of all types of bit sequence error.

As usual, the error correction code CRC could be added at the end of the message, but due to the slicing of the messages into bursts, this would lead to a complicated handling of the CRC, namely an additional burst at the end of the message would be needed to include the CRC bits and this would results in a too high overhead in case of one burst messages.

SUMMARY OF THE INVENTION

The error correction apparatus according to the present invention generates the error correction code (CRC) of messages switched in interleaved data bursts between data processing units in a communication system and exchanged, through busses (10) comprising a plurality of wires. In general, an error correction apparatus for insuring the integrity of the messages exchanged between data processing unit in a multi-origin/multi-target units switching system wherein the messages are exchanged through fixed size bursts or cells. Each unit comprises an error control circuit which computes for each burst of a message (for a destination unit) an error correction code as a function of an initial error correction code at the first burst of the message or of the error correction code of the previous burst and of the data bytes of the burst. The burst error correction code is sent on a medium which is separate from the data transport medium as a companion of the burst. Also, the error control circuit receives the burst error correction code from an origin unit and generates the burst error correction code to be compared with the received burst error correction code. If a mismatch is detected, the burst found in error is flagged.

In particular the error correction apparatus is comprised of:

error correction code generating means responsive to the contents of the current data burst of the message sent by the unit towards a destination unit for generating a current error correction code associated to the current data burst as a function of an initial error code value if the burst is the first burst of the message or as a function of the previous error correction code associated to the previous burst of the message sent to the same destination unit, first saving means for saving the current error correction code and providing said current error correction code to the error correction generating means when the next burst of the message is ready to be sent, error correction code sending means for sending the current error correction code on at least one dedicated control wire of the bus connecting the unit to the destination unit, as a companion to the data burst contents which are sent by the unit through separate data wires.

In a preferred embodiment of the present invention the first saving means comprise:

a first control block memory including a number of memory locations equal to the number of possible destination units for the said unit, wherein one location is assigned to each possible destination unit, memory addressing means for generating the memory address of the location assigned to the destination unit at which a message data burst is to be sent and providing the error correction code stored at that address to the error correction code generating means and then writing the current error correction code at that memory address. The error correction apparatus according to the present invention also comprises :

error correction code checking means receiving the data bursts and associated error correction code from an origin unit through a dedicated control wire and the data wire of the bus connecting the unit and the origin unit, and responsive to the contents to each burst-of a message received from an origin unit to compute the current error correction code associated to the burst as a function of an initial error correction code if the burst is the first burst of the message or as a function of the previous error correction code computed when the previous burst of the message from the same origin unit was received, comparing means for comparing the current error correction code with the received error correction code and generating a signal indicative of a message error when a mismatch is detected, second saving means for saving the current error correction code and providing said error correction code to the error checking means when the next burst of the message from the same origin unit is received.

In a preferred embodiment of the invention the second saving means comprise:

a second control block memory including a number of memory locations equal to the number of possible origin units for which the said unit can receive messages, wherein one location is assigned to each possible origin unit, memory addressing means for generating the memory address of the location assigned to the origin unit from which a message data burst is received and providing the error correction code stored at that address to the error correction code checking means and then writing the current error correction code at that memory address.

The error correction apparatus according to the present invention is preferably implemented in a communication system wherein the units are connected through the busses to a switching system which runs a selection process during each burst time (Ti), to select pairs of units comprising an origin and a destination unit and sends to the selected units the address of the unit from which they will receive a data burst and the address of the unit to which they will send a data burst during a next burst time (Ti+k), with k higher than 1, said addresses being sent through a first control wire of the busses connecting the unit to the switching system.

DETAILED DESCRIPTION OF THE INVENTION

Figure 1:
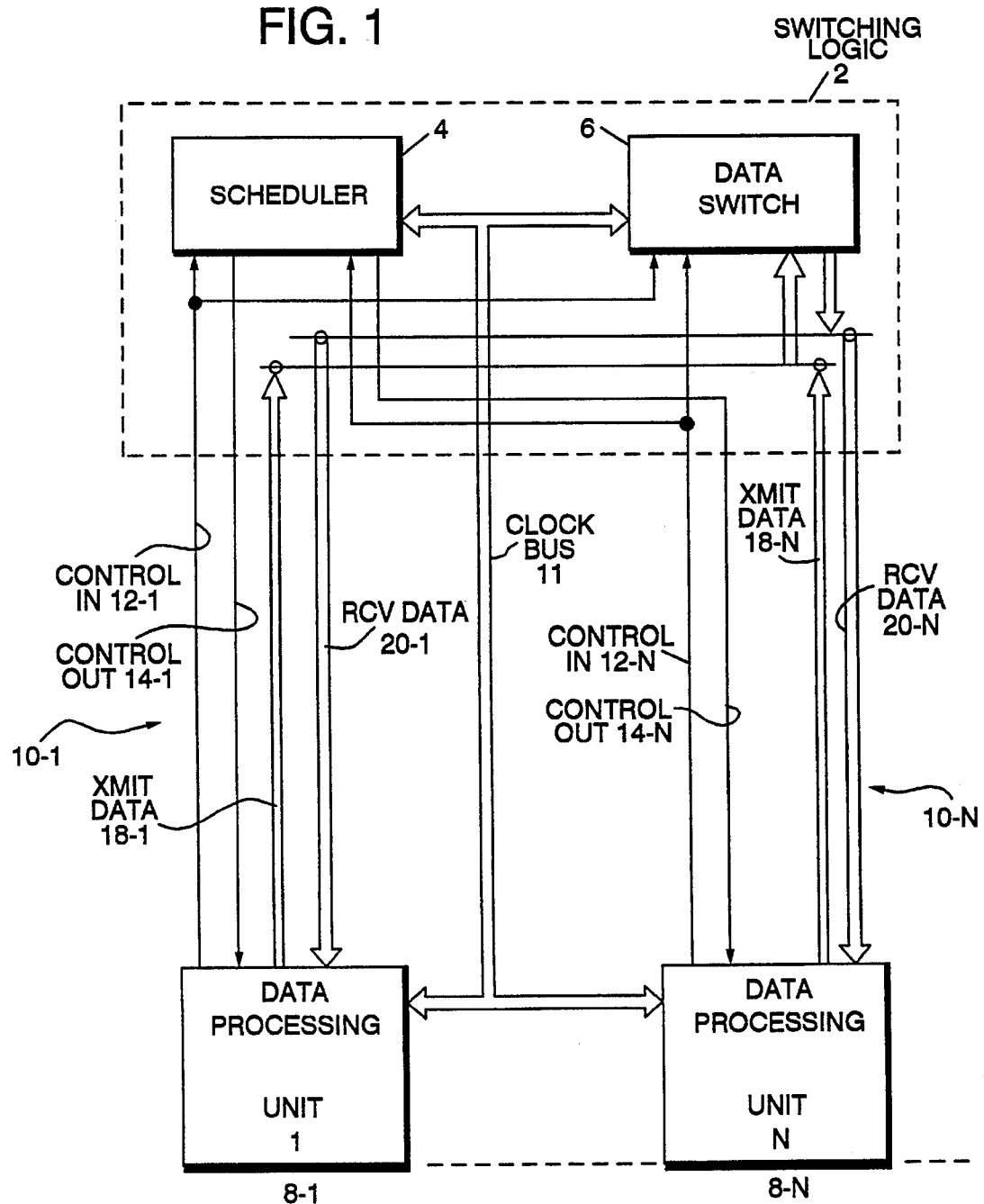
FIG. 1 represents a communication system wherein the apparatus according to the present invention for generating and checking the error correction code of message can be implemented.
Figure 2:
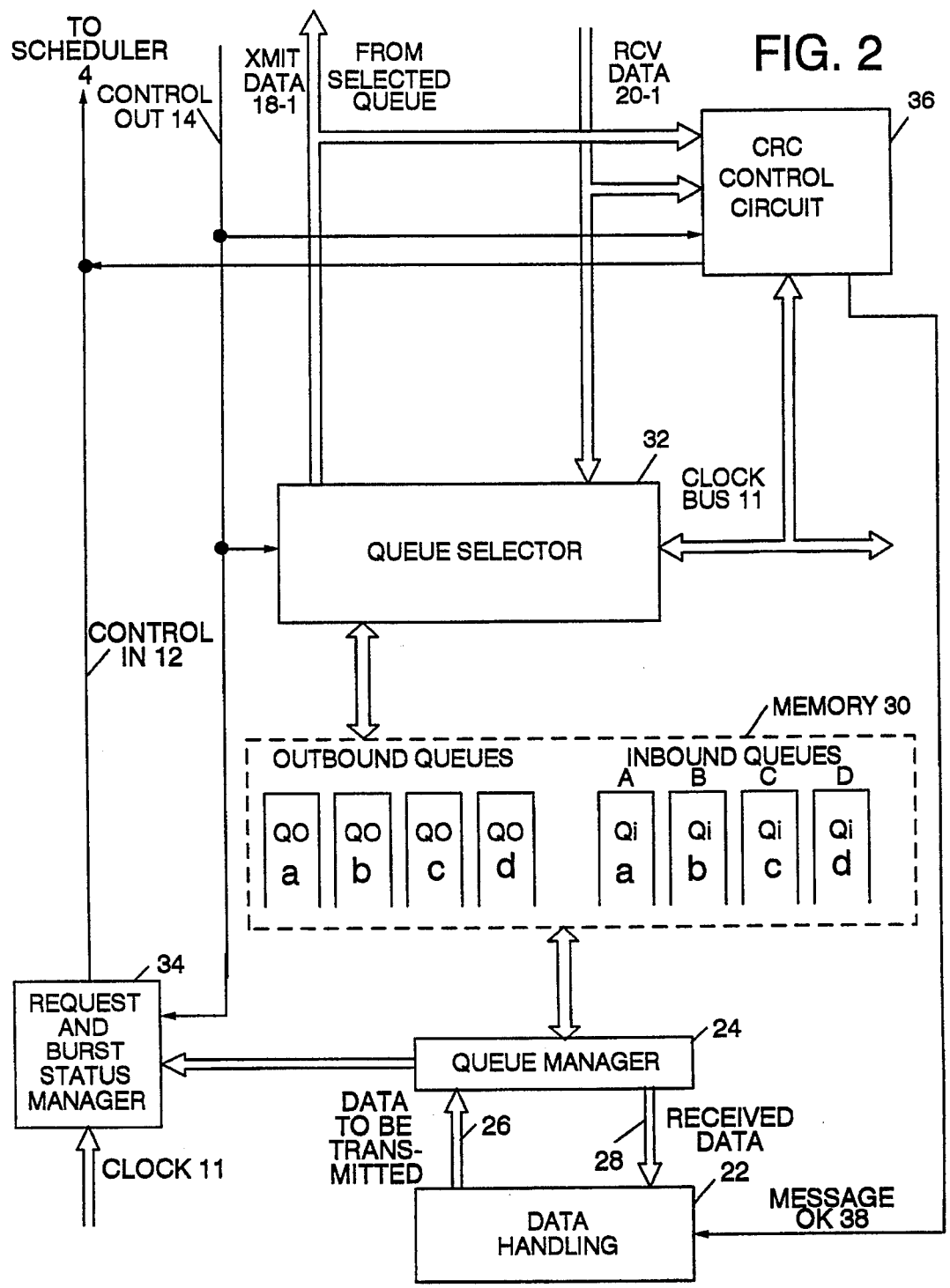
FIG. 2 represents the block diagram of a data processing unit of FIG. 1, incorporating the CRC control circuit.

The present invention is implemented in a switching system such as described in the above referenced patent application and represented in FIGS. 1 and 2.

The switching system comprises a switching logic circuit 2 connected to N data processing units which may be communication adapters referenced 8-1 to 8-N, through busses 10-1 to 10-N, respectively.

Each one of the busses 10-1 to 10-N comprise wires used to carry serial bit streams, namely a CONTROL IN wire 12-1 to 12-N and a CONTROL OUT wire 14-1 to 14-N. The CONTROL IN wires 12-1 to 12-N are connected to a scheduler 4 in the switching logic circuit 2. The scheduler generates the serial bit stream on the CONTROL OUT wires 14-1 to 14-N in response to the bit streams from the data processing units on the CONTROL IN wires 12-1 to 12-N. The switching control signals from the control IN wires are provided to a data switch 6 in switching logic to control the transfer of data bursts from the pairs of units selected by the scheduler as described in above referenced European Patent Application.

Busses 10-1 to 10-N also comprises XMIT-DATA wires 18-1 to 18-N and RCV-DATA wires 20-1 to 20-N, which are respectively used to carry data bytes between the data processing units 8-1 to 8-N and the data switch 6 and between the data switch and the data processing units 8-1 to 8-N, in parallel.

In addition, scheduler 4 sends to the data processing units 8 and to the data switch 6 and receives from the data processing units 8, clock signals through a clock bus. 11 to time the data transfer operations.

As previously described, the stream of information to be transferred between the data processing units is sliced in bursts having a fixed length. These bursts are synchronously exchanged in one burst time, i.e. for these bursts, the transmission starts and ends at the same time.

The burst time is equal to the time required to transfer a data burst.

Scheduler 4 selects pairs of units comprising one transmitting unit (origin unit) and the corresponding one receiving unit (target unit) among the N data processing units 8-1 to 8-n, by running a selection algorithm as described in the referenced European Patent Application. This selection algorithm optimizes the overall exchange capability of the switching logic 2 by selecting a maximum number of pairs of data processing units during each burst time. The units may be selected for transmitting, for receiving or for both transmitting and receiving.

Briefly, during the burst time Ti, simultaneous transfers are performed between the data processing units of the pairs selected during a previous burst time T(i−k) through their associated RCV and XMIT data wires 20 and 18 and scheduler 4 determines the pairs of data processing units which will be selected for performing the data transfers during the next burst time T(i+k). k may be equal to 1 or in the preferred embodiment of the invention equal to 5, in order to implement an efficient pipelining of the processing steps.

The selection is performed under control of the CONTROL IN bit streams including the transfer requests from the units and depending upon the transfers performed during the previous burst times, so as to give each data processing units an equal opportunity of being selected.

FIG. 2 represents the block diagram of a data processing unit when implemented in a switching system including four units called A, B, C and D.

FIGS. 2 to 10 represent the detailed implementation of any unit among the N units, so that the suffixes 1 to N after the reference numbers have been cancelled.

Each unit comprises conventional data handling means 22 which process the data received by the unit or to be transmitted by the unit.

The data to be transmitted are provided to a queue manager device 24 through a bus 26 and the received data are provided from the queue manager device 24 to the data handling means 22 through a bus 28.

The data to be transmitted and the received data are stored in memory 30. Each unit considers itself and the other data processing units as potential targets to which it may transmit data bytes. So memory 30 houses one queue towards each unit. These queues are called the outbound queues.

Since it is assumed that there are four data processing units A, B, C, and D there are four outbound queues QOa, b, c and d. For example, in unit A, the outbound queue QOa is used by unit A to enqueue the data to be transmitted to unit A for wrap test purposes, the outbound queue QOb is used to enqueue the data to be transmitted to unit B, etc.

There is also an inbound queue QIa, b, c, d per unit, which is used to enqueue the data received from the units A, B, C and D respectively. The data read from the inbound queues are sent to the data handling means 22 under control of the queue manager 24.

A request and burst status manager circuit 34 generates fields of the serial bit stream on CONTROL IN wire 12-1 from requests generated by the queue manager 24 when the outbound queues become not empty, from the bit stream on the CONTROL OUT wire 14-1.

According to the subject invention a CRC control circuit 36 is provided to process the error correction code in a system such as described in reference to FIGS. 1 and 2.

The CRC control circuit 36 generates the error correction bits CRC sent at each burst time on the CONTROL IN wires and check the CRC bits from the CONTROL OUT wire to generate a signal on line 38 indicative that the received message is free of error or not. It receives the data from the XMIT-DATA and RCV-DATA Busses 18-1 and 20-1 and the timing signals from bus 11.

Figure 3:
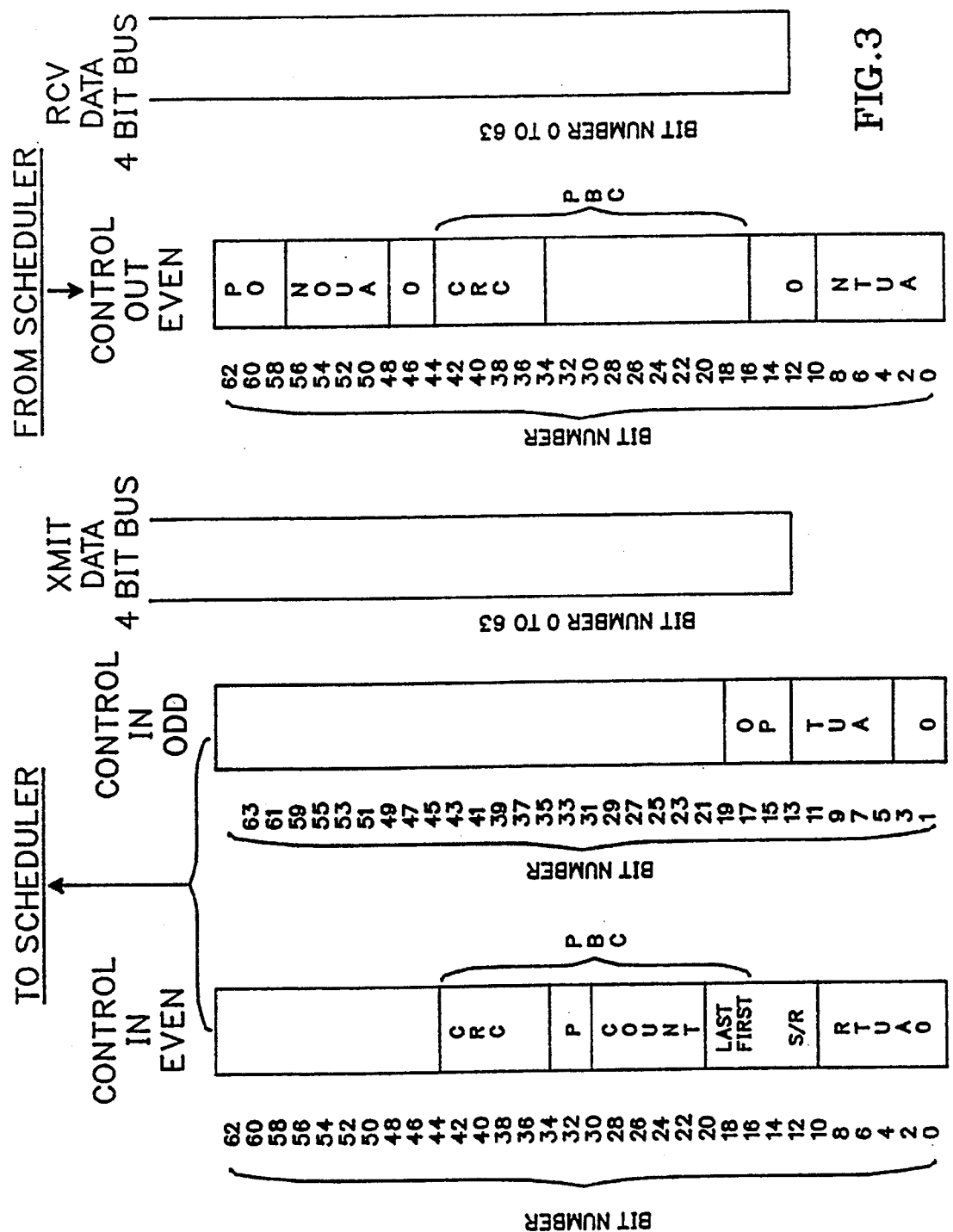
FIG. 3 represents the format of the control field and data burst on the bus linking a data processing unit and the switching logic.

On the control IN and OUT wires, the serial bit stream is also sliced into burst times, and the format of the serial bit stream within a burst time is shown in FIG. 3.

On the CONTROL IN wire, the bits with an even number are shown as CONTROL IN EVEN and the bits with an odd number are shown as CONTROL IN ODD.

Only the useful bits are described hereafter. Even numbered bits 0 to 12, are used to carry the Request Target Unit Address RTUA and a set/reset bit S/R, the bits in this field are used to set or reset a request to the scheduler, as described in above referenced patent application to run the selection algorithm. They reflect the status of an outbound queue toward a target unit, when such a queue becomes not empty, a request is set and when it becomes empty, the request is reset.

Even numbered bits 16 to 44 carry the packet burst control information PBC. Bit 16 is set to 1 to indicate that the burst is the first burst of the packet transmitted on the XMIT-data wires. Bit 18 is set to 1 to indicate that the burst is the last one. Bits 20 to 30 carry the packet byte count. Bit 32 is a parity P bit. Bits 34 to 44 carry the CRC of the burst sent on XMIT-data wires. The following bits 46 to 62 are not used, for the purpose of implementing the subject invention.

The odd numbered bits on the CONTROL IN wire are used to carry the target unit address TUA at which the associated burst on the XMIT-DATA wires is aimed.

As shown in FIG. 3, the data burst on XMIT-DATA wires is shifted with respect to the associated control block, in order the scheduler receives the target unit address before the data burst, which is necessary to control the burst switching.

On the CONTROL OUT wire, only the even numbered bits are useful for implementing the apparatus of the present invention.

The even numbered bits 0 to 10 are used to carry the Next Target Unit Address NTUA and bits 48 to 58 are used to carry the Next Origin Unit Address NOUA, which are sent by the scheduler at each burst time to determine the pairs of selected units, as described in above referenced European Patent Application.

Figure 4:
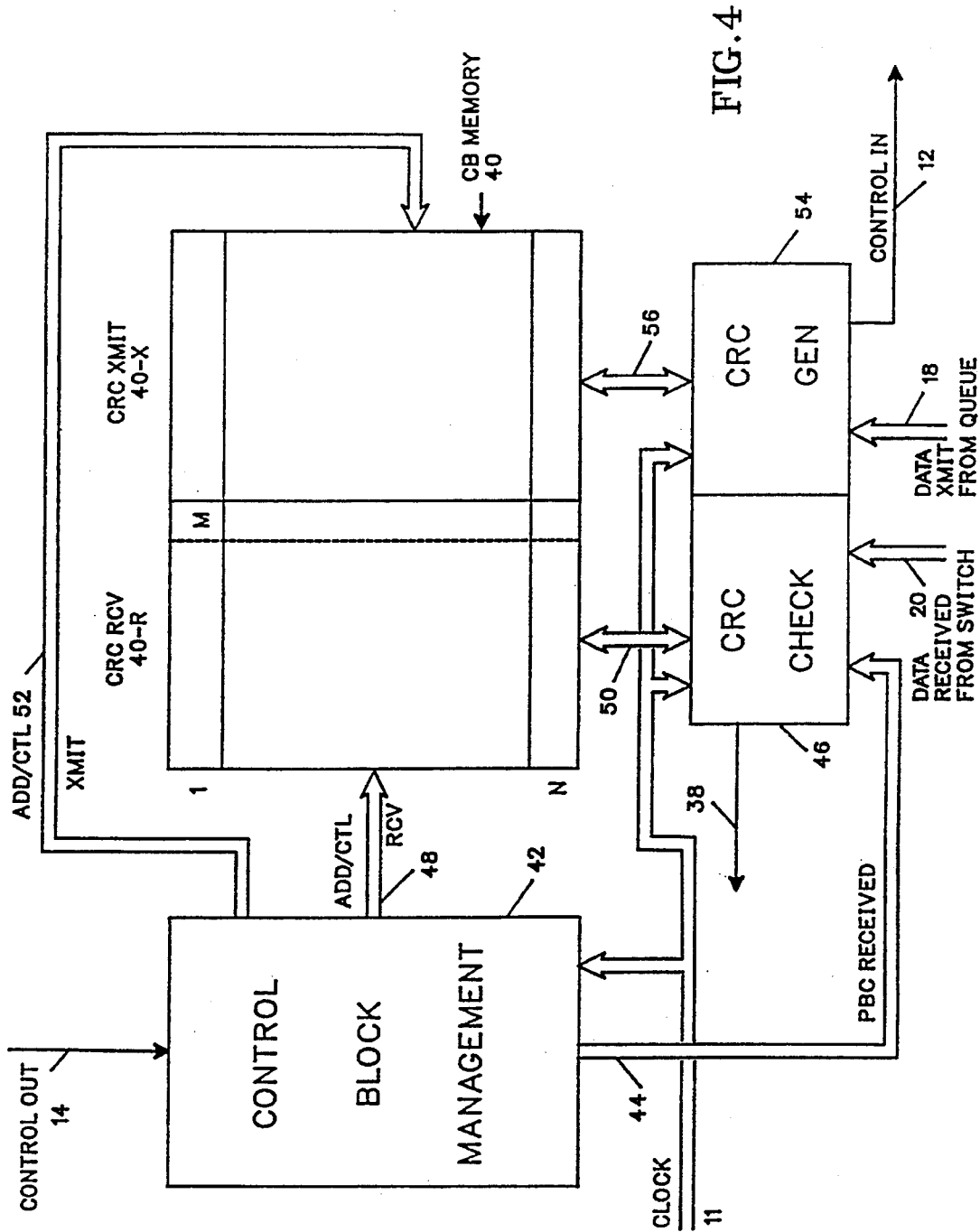
FIG. 4 represents the block diagram of the CRC control circuit.

Bits 16 to 44 are used to carry the packet control block PBC associated to the received burst on RCV-DATA wires, including the CRC code (bits 34 to FIG. 4 represents the block diagram of the CRC control circuit 36 of FIG. 2.

It comprises a control block CB memory 40 made of a RCV-part 40-R and a XMIT-part 40-X. Each part comprises N memory locations with one location assigned to a corresponding one unit among units 8-1 to 8-N.

The CB memory 40 is addressed by a control block management circuit 42 which processes the EVEN serial bit stream from the CONTROL OUT wire 14 in order to retrieve the packet control block PBC including the burst status and CRC accompanying each received data burst and provides the retrieved PBC on bus 44 to the CRC checking circuit 46.

The receive part 40-R is addressed by the control block management circuit 42 which generates address and control information on bus 48 from the NOUA bits indicative of the address of the origin unit from which the data are received, to read the old CRC computed when the preceding burst from the same unit was received and stored into the CRC control block assigned to the part. This old CRC is provided to CRC checking circuit 46 through bus 50. CRC checking circuit 46 computes the new CRC from the old CRC and the received data burst bytes, checks if the computed CRC is equal to the received CRC and stores the new CRC into the CB memory in replacement of the old CRC with an indication of the mismatch,, if any.

Thus, the CRC is checked for each burst and the result is memorized for all the bursts belonging to the message. At the first burst of a message found in error (mismatch between the computed CRC and received CRC), a flag M is set into the control block associated to the unit so that if at least one of the burst checking results in an error indication, the whole message will be flagged in error.

The transmit part is addressed by the control block management circuit 42 which generates address and control information on bus 52 from the NTUA bits indicative of the address of the target unit to which a data burst is to be sent, to read the old CRC computed when the preceding burst to the same unit was computed and stored into the CRC control block assigned to the unit. This old CRC is provided to the CRC generating circuit 54 through bus 56 so that this circuit computes the new CRC accompanying the data burst to be transmitted, from the value of the old CRC and data burst bytes contents received from bus 18 to generate the serial bit stream on CONTROL IN wire and store the new CRC into the memory 40-X.

Obviously, all the operations of the control block management circuit 42, circuits 46 and 54 are timed by clock signals from bus 11.

Figure 5:
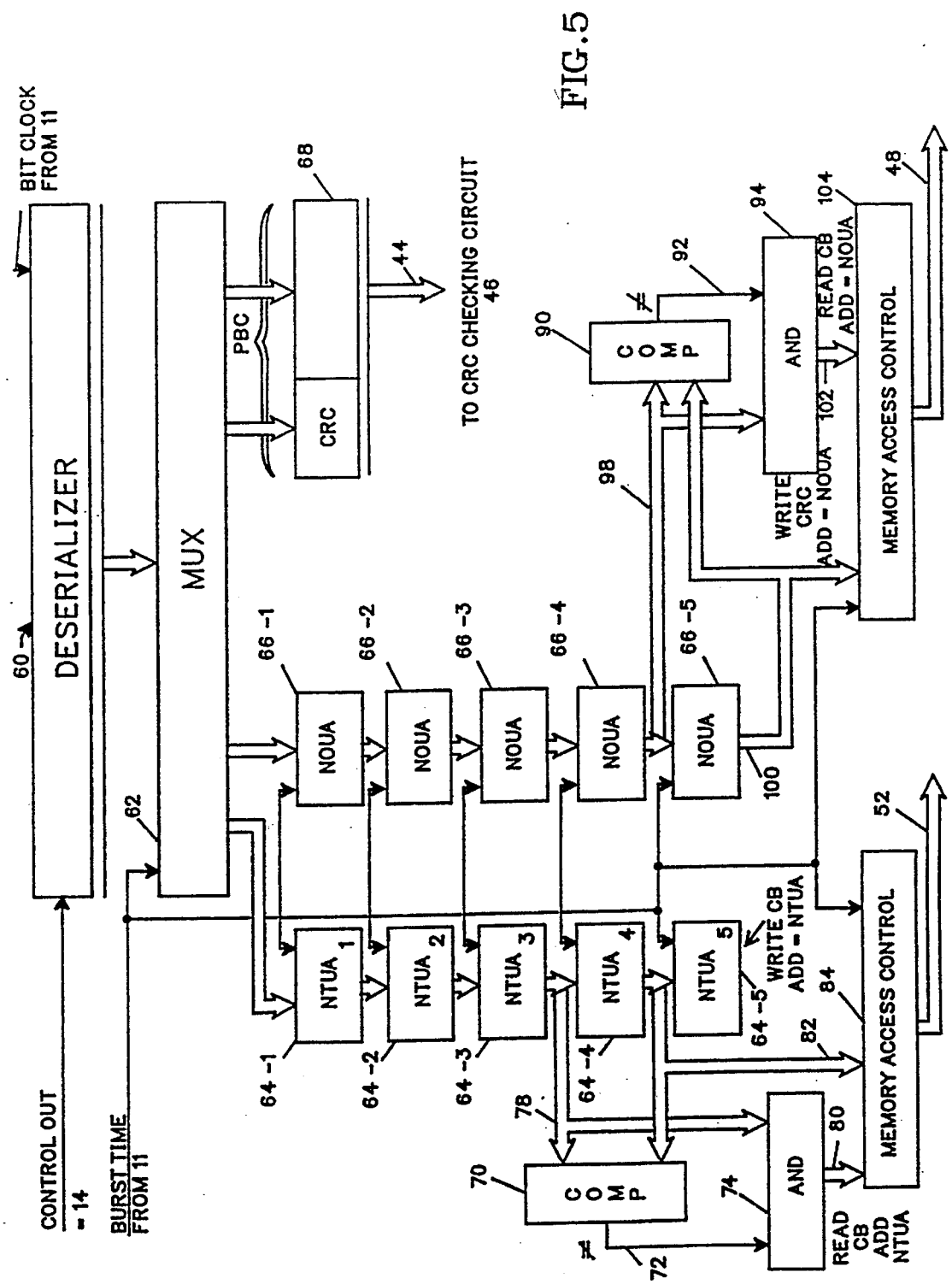
FIG. 5 represents the control block management circuit 42 of FIG. 4 in more details.

FIG. 5 represents the control block management circuit 42 in more details. It comprises a deserializer 60 to which the serial bit stream on the CONTROL OUT wire is inputted to the bit clock rate and at each burst time, the contents of the serializer is transferred to multiplex arrangement 62 to gate the NTUA bits, NOUA bits into the first registers 64-1 and 66-1 of a register stack comprising five registers 64-1 to 64-5 and 66-1 to 66-5, in such a way that at each burst time the contents of one register of the stack is shifted into the next register. The PBC bits which comprises the burst status and the CRC bits associated with the received burst are gated into PBC register 68 to be provided to the CRC checking circuit 46.

The register stacks 64 and 66 are needed, since as explained before, the NTUA and NOUA information is provided by the scheduler at a burst time Ti, at a unit for indicating from which unit NOUA it will receive a burst and at which unit it will have to send a burst at a next burst time Ti+k, with k=5 for example. Generally, two contiguous bursts received by a unit from the bus 20 do not originate from the same origin units but from different units, except in some instances depending upon the unit selection made by the scheduler running the selection algorithm based upon the pending requests.

For the same reason, the contiguous bursts sent by a unit on bus 18 are not aimed at the same target units except in some instances.

Consequently, the NTUA bits in register 64-1 which are received at burst time Ti for controlling the sending of a burst by a unit at burst time Ti=5, are present in register 64-3 at time Ti+3, and in register 64-4 at time Ti+4. Consequently, if a different target unit is selected by the scheduler at burst time Ti+1, the contents of register 66-3 and 66-4 are different, if not i.e. if the same unit is selected their contents are equal. The NTUA value in register 64-3 is provided to comparator 70. If an inequality is detected, a "1" is provided by comparator 70 on its output line 72 to AND gate 74 which gates the contents of the register 64-3 with a read control signal on its output 80 to read the old CRC used for computing the new CRC which will be sent as a companion to the data burst, during time Ti+5. The CRC is computed during burst time Ti+4, and the new CRC is written at the address given by the value in register 64-4 provided on bus 82. Busses 80 and 82 are provided to a memory access control circuit 84 which provides the address and Read/Write control signal on bus 52.

If the comparator 70 detects an equality, the write access to the memory is not made and the old CRC used to compute the new CRC is the one computed during previous burst time, by CRC generating circuit 54.

The CB memory access for controlling the CRC generation on the receive side is controlled by the NOUA bits. The NOUA bits received at each burst time Ti represent the address of the unit from which a burst will be received at a next burst time Ti+k.

Consequently, the NOUA bits received at each burst time are shifted in the shift register stack 66. The NOUA bits found in register 66-4 are provided to comparator 90 which has a function identical to the function of comparator 70, i.e it compares the NOUA bits in register 66-4 with the NOUA bits in register 66-5. If an inequality is detected, meaning that two contiguous received bursts have different origin unit, the NOUA bits from register 66-4 are provided as read address to memory access control circuit 104 through AND gate 94, which generates the read address on bus 48 therefrom.

The read CB is used to compute the CRC of the received burst and check it by comparing it to the CRC accompanying the received burst taken from register 68. The NOUA bits in register 66-5 are provided to memory access control circuit 104 through bus 100 as write address of the CB memory which generates the write address on bus 48, therefrom.

Figure 6:
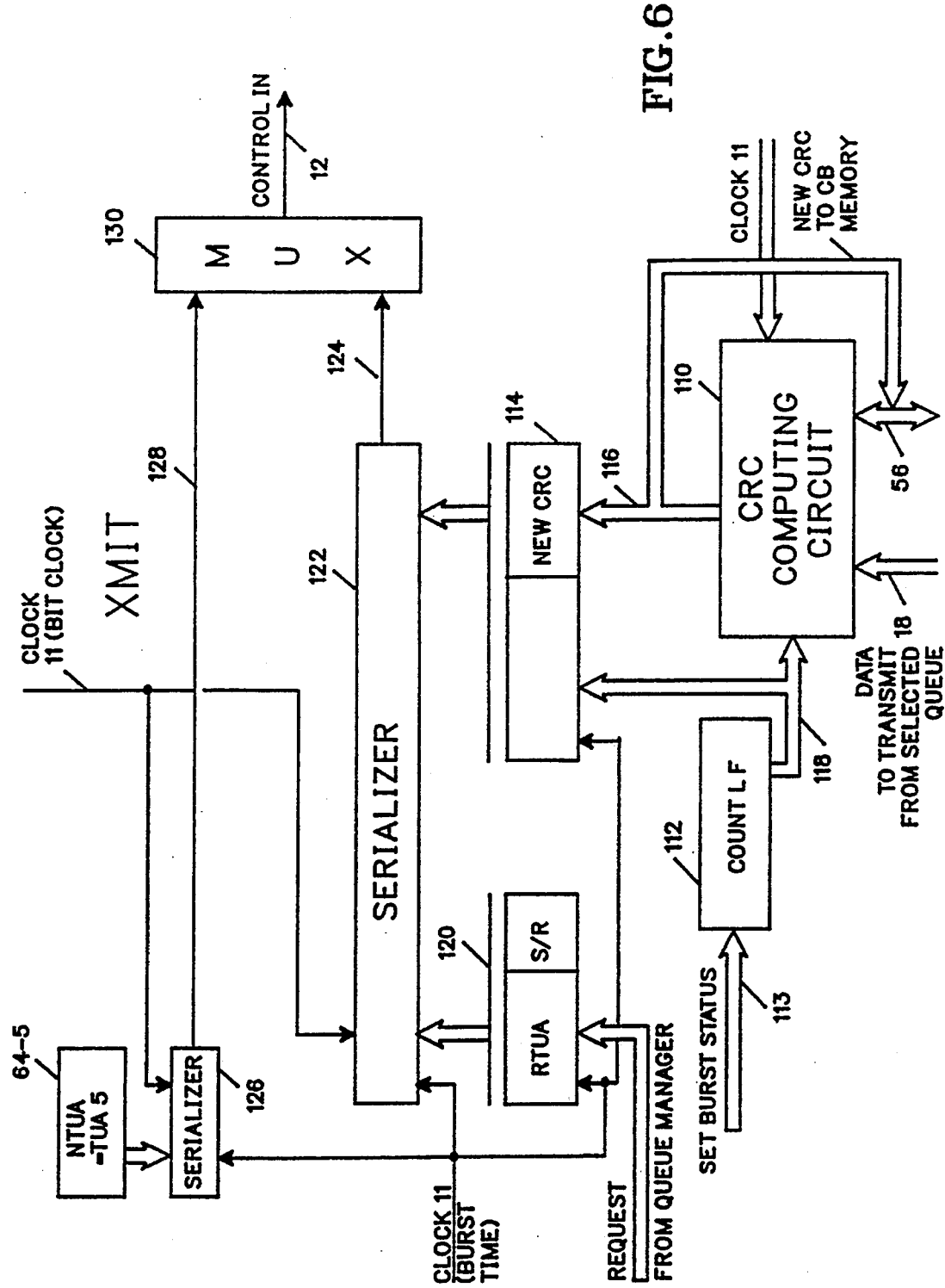
FIG. 6 represents a detailed implementation of CRC generating circuit 54.

FIG. 6 represents the CRC generating circuit 54 in more details.

The data processing unit provides the data burst to be transmitted which is read from a queue selected by using the NTUA bits, to a CRC computing circuit 110 together with the old CRC read from CB memory through bus 56 or computed within circuit 110, if two consecutive bursts of the same message are processed. The burst status is provided into register 112 through bus 113 from the queue selector. The burst status comprises a F bit to indicate whether the burst is the first burst of a message or not, a L bit to indicate whether the burst is the last burst and count bits to indicate the number of bytes of the burst if the count is less than 32 bytes. These bits are used within the CRC computing circuit 110 as will be explained later on in connection with the description of an implementation of circuit 110.

The new CRC and the burst status are provided into the register 114 through busses 116 and 118 during burst time Ti-1 in order to be sent with the data burst during the next burst time Ti.

The new CRC is written into the CB memory 40-X.

At the same time, a request register 120 is loaded with a set or reset bit and a corresponding request target unit address RTUA, to set or reset a request and provide this information to the scheduler.

The contents of registers 120 and 114 are provided to serializer 122, to be shifted at a frequency equal to the half of the bit clock frequency on the output line 124. The contents of register 64-5 which comprised the address of the target unit TUA, is shifted through serializer 126 at the same frequency as the contents of registers 120 and 114, on line 128.

Multiplex circuit 130 receives the bit streams from line 124, (even numbered bits) and from line 128 (odd numbered bits) and merge these bits stream on CONTROL IN line 12 according to the format described in reference to FIG. 3.

Figure 7:
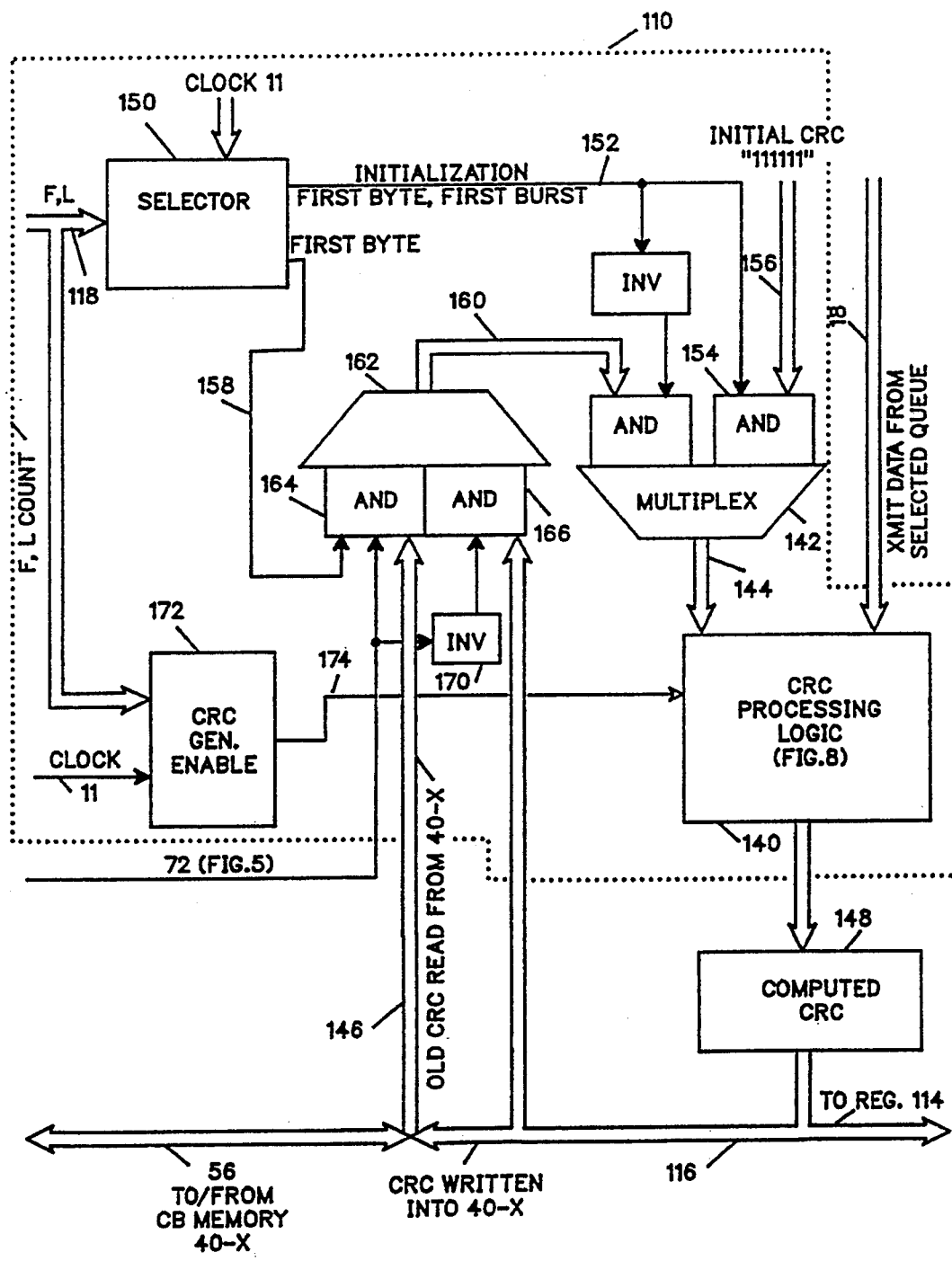
FIG. 7 represents the CRC computing circuit 110 of FIG. 6.
Figure 8:
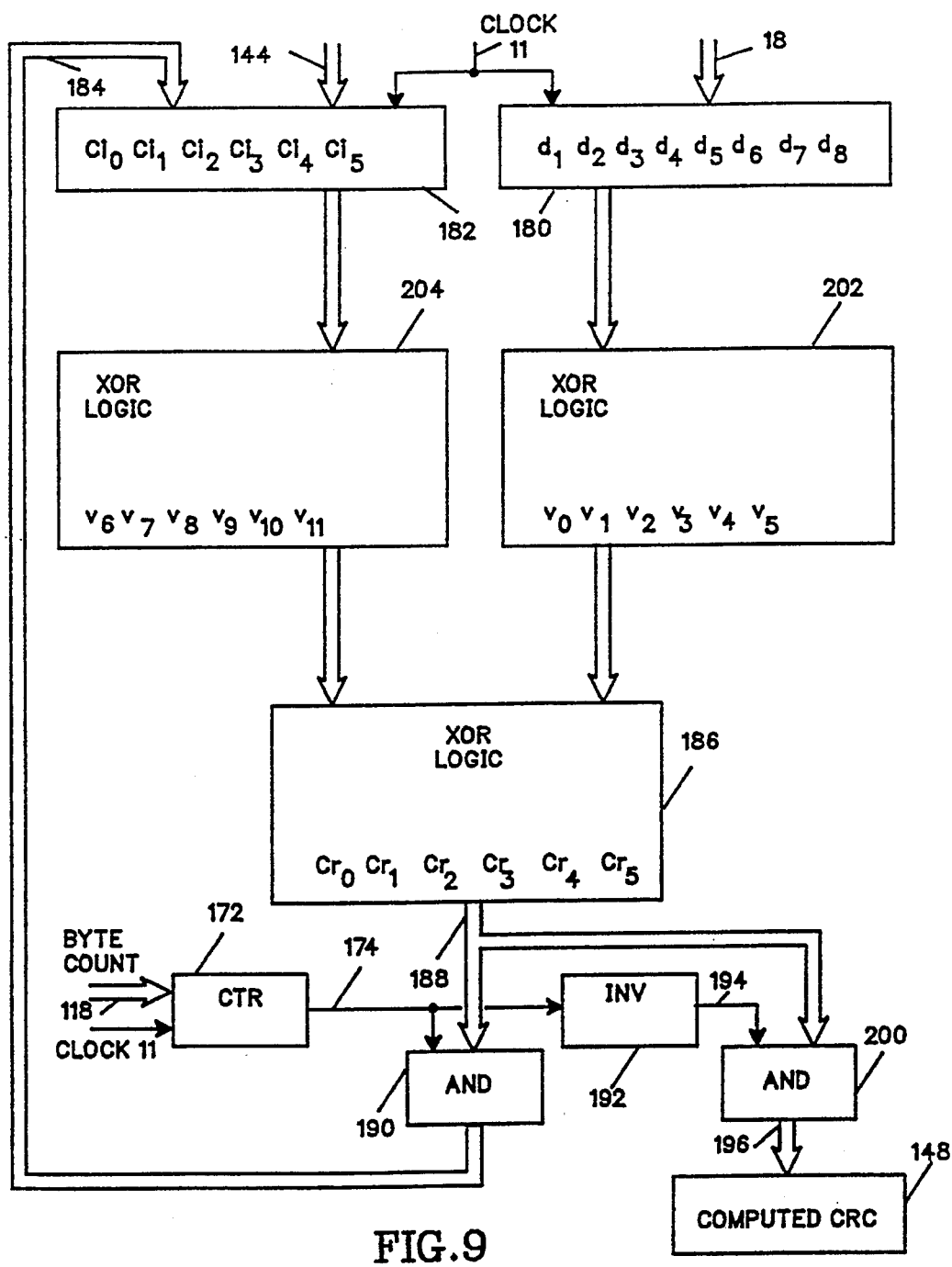
FIG. 8 represents the CRC processing logic circuit 140 of FIG. 7.

FIGS. 7 and 8 represent the CRC computing circuit 110. As shown in FIG. 7, it comprises a CRC computing logic shown as box 140 which is represented in more details in FIG. 8. The CRC computing logic 140 receives the data bytes of the burst to be transmitted from a selected queue through bus 18 and an old CRC value provided by multiplex circuit 142 through bus 144. This old CRC is either the initial CRC value "111111" or the old CRC read from the CB memory on bus 146 or the CRC computed at the end of the burst in case the next contiguous burst is aimed at the same unit, as indicated by the result of the comparison on line 72. The CRC computed at the end of the burst is stored into register 148. The output bus of the register 148 is the bus 116 of FIG. 6.

The burst status on bus 118 is provided to a selector 150, which activates line 152 during the first bit time, when it detects that the burst is the first burst of the message. Line 152 is provided to an input of AND gate 154 to gate the initial CRC value "111111" from bus 156 on bus 144. Selector 150 activates line 158 during the first bit time of each burst to gate either the old CRC provided from CB memory on bus 146 if line 72 is active, or the computed CRC from bus 116 if line 72 is inactive (which means that a second contiguous burst is to be sent to the same target unit), on output bus 160 of multiplex 162, through AND gates 164 and 166 which are respectively conditioned by the signals on lines 158 and 72 and by the signal on line 72 inverted by inverter 170.

The CRC processing logic 140 is enabled by CRC generator enable circuit 172 which is responsive to the byte count provided from bus 118 to provide a CRC enable signal on line 174.

In the preferred embodiment of the present invention, a 6-bit CRC is used. In order to improve the system performances, it is computed at each bit time, in response to the eight bit d1, d2, d3, d4, d5, d6, d7, d8, of a burst byte, and to an intermediate CRC value comprising 6 bits ci0, ci1, ci2, ci3, ci4, ci5 which is the CRC value computed at the previous bit time.

The CRC computing logic shown in FIG. 8 comprises two input registers 180 and 182. A byte of the burst is provided into register 180 at each bit time and the intermediate CRC is provided into register 182.

The initial value in register 182, at the first bit time of a burst is provided from multiplex 142 on bus 144, and then the intermediate CRC is provided from the bus 184, it is equal to the CRC bits cr0, cr1, cr2, cr3, cr4, cr5 computed at each bit time and provided by XOR arrangement 186 on bus 188 through AND gate 190.

AND gate 190 is conditioned by signal 174 from CRC generator enable circuit 172 which is a counter loaded with the burst byte count and decremented at each bit time, so that line 174 is activated until the counter value is equal to 0.

The signal on line 174 is inverted by inverter 192 to gate the CRC bits cr0, cr1, cr2, cr3, cr4, cr5, from bus 188 onto output bus 196 of AND gate 200 conditioned by the signal on output line 194 of inverter 192, and loaded into the Computed CRC register 148.

At each bit time the CRC bits cr0 to cr5 are computed from intermediate values v0 to v5, computed by XOR arrangement 202 from the data bits and from intermediate value v6 to v11 computed from the ci bits of the intermediate CRC by XOR arrangement 204, as shown in FIG. 8.

Values computed by XOR arrangement 202:

$v0 = d2 \oplus d3 \oplus d4 \oplus d8$ $v1 = d1 \oplus d4 \oplus d7 \oplus d8$ $v2 = d2 \oplus d4 \oplus d6 \oplus d8 \oplus d7$ $v3 = d1 \oplus d3 \oplus d5 \oplus d6 \oplus d7$ $v4 = d2 \oplus d4 \oplus d5 \oplus d6$ $v5 = d1 \oplus d3 \oplus d4 \oplus d5$ Values computed by XOR arrangement 204:

$v6 = ci2 \oplus ci3 \oplus ci4$ $v7 = ci2 \oplus ci5$ $v8 = ci0 \oplus ci2 \oplus ci4$ $v9 = ci0 \oplus ci1 \oplus ci3 \oplus ci5$ $v10 = ci0 \oplus ci1 \oplus ci2 \oplus ci4$ $v11 = ci1 \oplus ci2 \oplus ci3 \oplus ci5$ Values computed by XOR arrangement 186:

$cr0 = v0 \oplus v6$ $cr1 = v1 \oplus v7$ $cr2 = v2 \oplus v8$ $cr3 = v3 \oplus v9$ $cr4 = v4 \oplus v10$ $cr5 = v5 \oplus v11$ These equations are the result of the CRC generation process using a generator polynomial $X^6 + X + 1$ run on a serial bit stream and adapted to process 8 bits in parallel.

Figure 9:
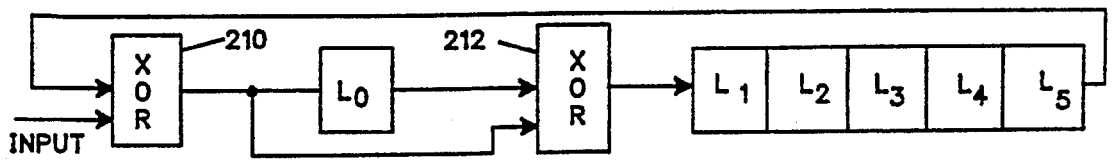
FIG. 9 represents a conventional circuit which may be used for computing the CRC on a serial bit stream.

FIG. 9 represent the conventional CRC generation circuit for a serial bit stream using the generator polynomial $X^6 + X + 1$.

It comprises two XOR circuits 210 and 212 and six shift register latches L0 to L5, arranged as shown in FIG. 9. If such a circuit were used, the serial data bit stream would be inputted to XOR circuit 210, the other input of which is taken at the output of the last latch L5. The inputs of XOR circuit 212 are taken at the output of XOR circuit 210 and output of latch L0.

The equations needed for computing the intermediate values v0 to v11 and the cr0 to cr5 values are obtained by determining the contents of the latches L0 to L5 after a eight bit shifting, assuming that the initial value set into the latches at the first bit time of a message is 111111.

Should a different generator polynomial be chosen, the same process can be implemented by the man skilled in the art to design the CRC computing logic circuit processing the bits of successive bytes of a burst in parallel.

Figure 10:
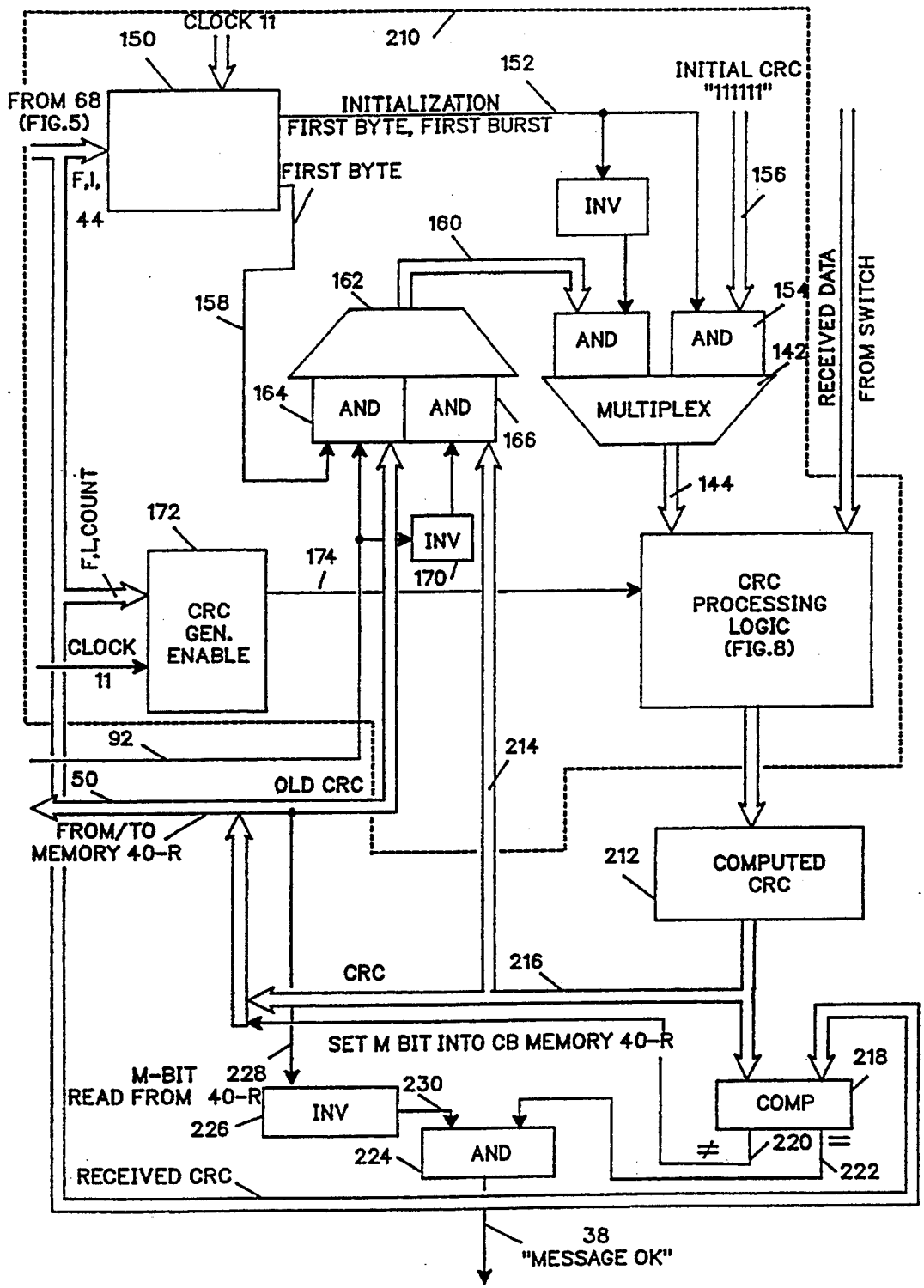
FIG. 10 represents the detailed implementation of the CRC checking circuit 46.

FIG. 10 represents the CRC checking circuit 46. It comprises a CRC computing circuit 210 similar to the CRC computing circuit 110 so that inside block 210, the different boxes are referenced by the same numbers as in box 110 and their operations are not described in details. Only the inputs and outputs to/from circuit 210 are different. The F,L and COUNT are provided from register 68 (FIG. 5) through bus 44, AND gate 164 is conditioned by the signal from line 92 (FIG. 5) and the CRC processing logic 140 which is identical to the logic shown in FIG. 8, processes the received bytes from bus 20, and the old CRC provided from the receive part 40-R of CB memory 40 through bus 214 to generate the CRC from the received burst into register 212. The computed CRC is provided through output bus 216 of register 212 to the memory bus 50 and to the AND gate 166 in circuit 210.

The computed CRC is also provided to comparator 218 to be compared with the received CRC in register 68.

If the comparator detects an inequality on a first or intermediate burst, it activates line 220 to set the mismatch bit M into the CRC control block in CB memory 40-R.

For the last burst, if an equality is detected, it activates line 222 which is provided as one input to AND gate 224, the other input of which received the inverted M-bit read from CB memory 40-R. The M-bit read from memory 40-R is provided on line 228 and inverted by inverter 226, the output line 230 of which is provided to one input of AND gate 224.

Thus, if the computed CRC and received CRC are equal and if the M bit is not set to 1, a "MESSAGE OK" signal is generated on output line 38 of AND gate 224 to be provided to the data handling means of the unit.

It results from the checking of each burst, that the error coverage is even better than if only a CRC were appended at the end of the message.

We claim:

1. An error correction apparatus (36) for generating the error correction code (CRC) of messages switched in interleaved data bursts between data processing units in a communication system, and exchanged through busses (10) comprising a plurality of wires, said error correction apparatus comprising, in each unit:

first error correction code generating means (54,110) responsive to the contents of the current data burst of the message sent by the unit towards a destination unit for generating a current error correction code associated to the current data burst as a function of an initial error code value of the burst if the first burst of the message or as a function of the previous error correction code associated to the previous burst of the message sent to the same destination unit, first saving means (40-X,148) for saving the current error correction code and providing said current error correction code to the error correction generating means when the next burst of the message is ready to be sent, and error correction code sending means (54;114,130) for sending the current error correction code on at least one first dedicated control wire of the bus connecting the unit to the destination unit, as a companion to the data burst contents which are sent by the unit through separate data wires.

2. An error correction apparatus (36) for generating the error correction code (CRC) of messages switched in interleaved data bursts between data processing units in a communication system, and exchanged through busses (10)comprising a plurality of wires, said error correction apparatus comprising, in each unit:

first error correction code generating means (54,110) responsive to the contents of the current data burst of the message sent by the unit towards a destination unit for generating a current error correction code associated to the current data burst as a function of an initial error code value of the burst if the first burst of the message or as a function of the previous error correction code associated to the previous burst of the message sent to the same destination unit, a first control block memory (40-X) including a number of memory locations equal to the number of possible destination units for the said unit, wherein one location is assigned to each possible destination unit, first memory addressing means for generating the memory address of the location assigned to the destination unit at which a message data burst is to be sent and providing the error correction code stored at that address to the error correction code generating means and then writing the current error correction code at that memory address, error correction code sending means (54;114,130) for sending the current error correction code on at least one first dedicated control wire of the bus connecting the unit to the destination unit, as a companion to the data burst contents which are sent by the unit through separate data wires.

3. The error correction apparatus according to claim 2 wherein the first saving means further comprises:

a first storing means (148) for storing the current error correction code associated to a data burst, gating means (116) for providing the contents of the first storing means to the error correction code generating means if the next burst sent from the unit is aimed at the same destination unit.

4. The error correction apparatus according to any one of claim 2 to 3 characterized in that the error correction generating means comprises an error correction code computing means (110) which receives the bytes of the data burst in parallel and the initial value of the error correction code or the correction code read from the first saving means in parallel to compute for each byte of the burst an intermediate error correction code used for computing the intermediate error correction code for the next byte, until the last byte of the burst is processed and use the last computed intermediate error correction code as current error correction code.

5. The error correction apparatus according to claim 2, 3 or 4 implemented in a communication system wherein the units are connected through the busses to a switching system which runs a selection process during each burst time (Ti), to select pairs of units comprising an origin and a destination unit and sends to the selected units the address of the unit from which they will receive a data burst and the address of the unit to which they will send a data burst during a next burst time (Ti+k), with k higher than 1, said addresses being sent through a first control wire of the busses connecting the unit to the switching system, said error correction apparatus being characterized in that in each unit:

the first memory addressing means are responsive to the address of the destination unit received from the first control wire during each burst time Ti to generate the address of the first control block memory and read the error correction code stored at that address and provide said error correction code to the error correction generating means for computing the current error correction code sent by the unit during burst time (Ti+k) through a second control wire of the bus connecting the unit to the switching system.

6. Error correction apparatus according to any one of claims 2 to 4 characterized in that it comprises in each unit error correction code checking means (46) comprising:

error correction code generating means (210) receiving the data bursts and associated error correction code from an origin unit through a second dedicated control wire and the data wires of the bus connecting the unit and the origin unit, and responsive to the contents to each burst of a message received from an origin unit to compute a current error correction code associated to the burst as a function of an initial error correction code if the burst is the first burst of the message or as a function of the previous error correction code computed when the previous burst of the message from the same origin unit was received, comparing means (218) for comparing the current error correction code with the received error correction code and generating an signal indicative of a message error when a mismatch is detected, second saving means (40-R, 212) for saving the current error correction code and providing said error correction code to the error correction code generating means when the next burst of the message from the same origin unit is received.

7. The error correction apparatus according to claim 6 characterized in that the second saving means comprise:

a second control block memory (40-R) including a number of memory locations equal to the number of possible origin units for which the said unit can receive messages, wherein one location is assigned to each possible origin unit, second memory addressing means for generating the memory address of the location assigned to the origin unit from which a message data burst is received and providing the error correction code stored at the address to the error correction code checking means and then writing the current error correction code at that memory address, 8. The error correction apparatus according to claim 7 characterized in that the second saving means comprise:

a second storing means (212) for storing the current error correction code associated to a data burst, gating means (116) for providing the contents of the second storing means to the error correction code checking means if the next burst received by the unit originated from the same origin unit.

9. The error correction apparatus according to any one of claims 6 to 8 characterized in that the error correction code generating means comprises an error correction code computing means (210) which receives the bytes of the data burst in parallel and the initial value of the error correction code or the error correction code read from the second saving means in parallel to compute for each byte of the burst an intermediate error correction code used for computing the intermediate error correction code for the next byte, until the last bytes of the burst is processed and use the last computed intermediate error correction code as current error correction code.

10. The error correction apparatus according to any one of claims 7, 8 or 9 characterized in that, each location of the second control block memory comprises a field into which an error flag is set at the first occurrence of a mismatch detected by the comparing means and in that it comprises means (224) responsive to the signal from the comparing means and from the flag read from the second control block memory to generate a signal indicative that the message is free of error if the flag bit is not set and a match is detected by the comparing means 11. The error correction apparatus according to claim 6, 7, 8, 9 or 10 implemented in a communication system wherein the units are connected through the busses to a switching system which runs a selection process during each burst time (Ti), to select pairs of units comprising an origin and a destination unit and sends to the selected units the address of the unit from which they will receive a data burst and the address of the unit to which they will send a data burst during a next burst time (Ti+k), with k higher than 1, said addresses being sent through a first control wire of the busses connecting the unit to the switching system, said error correction apparatus being characterized in that in each unit:

the second memory addressing means are responsive to the address of the origin unit received from the first control wire during each burst time Ti to generate the address of the second control block memory and read the error correction code stored at that address and provide said error correction code to the second error correction generating means for computing the current error correction code and providing said current error correction code to the comparing means at burst time T (i+k).

12. An error correction apparatus (36) for generating the error correction code (CRC) of messages switched in interleaved data bursts between data processing units in a communication system, and exchanged through busses (10) comprising a plurality of wires, said error correction apparatus comprising, in each unit:

first error correction code generating means (54,110) responsive to the contents of the current data burst of the message sent by the unit towards a destination unit for generating a current error correction code associated to the current data burst, as a function of previous error correction code associated to the previous burst of the message sent to the same destination unit;

first savings means (40-X,148) for saving the current error correction code and providing said current error correction code to the error correction generating means when the next burst of the message is ready to be sent; and error correction code sending means (54;114,130) for sending the current error correction code on at least one first dedicated control wire of the bus connecting the unit to the destination unit, as a companion to the data burst contents which are sent by the unit through separate data wires.

13. The error correction apparatus according to claim 12, wherein the current error correction further includes an error correction code associated with the current data bytes of the burst.

* * * * *